United States Patent
Tokiwa et al.

(10) Patent No.: US 9,168,700 B2
(45) Date of Patent: Oct. 27, 2015

(54) METHOD FOR PRODUCING POLYCARBONATE RESIN FOAM MOLDED ARTICLE

(75) Inventors: Tomoo Tokiwa, Tochigi (JP); Masahiro Gomibuchi, Tochigi (JP); Kazunobu Sato, Tochigi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 13/702,463

(22) PCT Filed: Jun. 7, 2011

(86) PCT No.: PCT/JP2011/003190
§ 371 (c)(1),
(2), (4) Date: Dec. 6, 2012

(87) PCT Pub. No.: WO2011/161885
PCT Pub. Date: Dec. 29, 2011

(65) Prior Publication Data
US 2013/0075944 A1    Mar. 28, 2013

(30) Foreign Application Priority Data
Jun. 24, 2010    (JP) .................. 2010-143283

(51) Int. Cl.
| | | |
|---|---|---|
| *B29C 44/34* | (2006.01) | |
| *B29C 67/20* | (2006.01) | |
| *B29C 44/08* | (2006.01) | |
| *B29C 44/50* | (2006.01) | |
| *C08J 9/04* | (2006.01) | |
| *C08L 69/00* | (2006.01) | |
| *C08G 63/199* | (2006.01) | |

(52) U.S. Cl.
CPC .............. *B29C 67/20* (2013.01); *B29C 44/08* (2013.01); *B29C 44/50* (2013.01); *C08G 63/199* (2013.01); *C08J 9/04* (2013.01); *C08L 69/00* (2013.01); *C08J 2201/03* (2013.01); *C08J 2369/00* (2013.01); *C08J 2467/00* (2013.01)

(58) Field of Classification Search
CPC .. C08L 69/005; Y10T 428/1376; B29C 49/04
USPC ............ 264/51, 54, 55, 413, 415, 416, 45.8, 264/45.9, 46.1, 45.1, 45.2, 632, 512
See application file for complete search history.

(56) References Cited

U.S. PATENT DOCUMENTS

| | | | | |
|---|---|---|---|---|
| 5,360,829 | A  * | 11/1994 | Kawabe et al. ............. | 521/81 |
| 6,447,859 | B2 * | 9/2002 | Oguro et al. ............... | 428/35.7 |
| 2002/0010309 | A1 | 1/2002 | Oguro et al. | |
| 2004/0138388 | A1 | 7/2004 | Pecorini et al. | |
| 2005/0075466 | A1 | 4/2005 | Oguro et al. | |
| 2005/0131165 | A1 | 6/2005 | Hale et al. | |
| 2007/0045893 | A1 * | 3/2007 | Asthana et al. ........... | 264/173.12 |

FOREIGN PATENT DOCUMENTS

| | | |
|---|---|---|
| EP | 1 460 106 A1 | 9/2004 |
| JP | A-11-80411 | 3/1999 |
| JP | A-11-130897 | 5/1999 |
| JP | A-2000-33643 | 2/2000 |
| JP | 2002-201260 A | 7/2002 |
| JP | A-2004-182938 | 7/2004 |
| JP | A-2006-522166 | 9/2006 |
| JP | A-2008-519130 | 6/2008 |

OTHER PUBLICATIONS

International Search Report issued in International Application No. PCT/JP2011/003190 dated Jul. 5, 2011 (w/translation).
Apr. 28, 2014 Extended European Search Report issued in European Patent Application No. 11797774.4.

* cited by examiner

*Primary Examiner* — Stella Yi
(74) *Attorney, Agent, or Firm* — Oliff PLC

(57) ABSTRACT

The present invention provides a foamed molded article production method that can produce polycarbonate resin foamed blow-molded articles, etc. Which are good over a wide range of densities. The present invention is a method for producing a foamed molded article including extruding a foamable molten resin, formed by kneading a polycarbonate resin, a polyester resin in an amount of 5 to 100 parts by weight per 100 parts by weight of the polycarbonate resin and a foaming agent, from a die to obtain a foamed parison, and molding the foamed parison in a softened state in a mold. The polyester resin is a polyester copolymer containing diol component units, 10 to 80 mol % of which are glycol component units each having a cyclic ether structure, and dicarboxylic acid component units.

8 Claims, No Drawings

METHOD FOR PRODUCING POLYCARBONATE RESIN FOAM MOLDED ARTICLE

TECHNICAL FIELD

The present invention relates to a method for producing a foamed molded article by molding a foamed parison in a mold. More specifically, the present invention is directed to a foamed molded article producing method that can produce polycarbonate resin foamed molded articles having a high closed cell content and a good surface state over a wide range of densities.

BACKGROUND ART

As a method for obtaining a hollow foamed molded article, there has been hitherto developed a method, so called foam blow molding method, which includes melting and kneading a thermoplastic resin and a foaming agent in an extruder, extruding the obtained foamable molten resin through a die to obtain a foamed parison having a foamed layer, sandwiching the foamed parison in a softened state between molds, blowing a pressurized gas into the parison to mold the parison into a shape conforming to the inner shape of the molds.

The thus obtained hollow foamed molded article has generally a lighter weight and better thermal insulating property as compared with non-foamed hollow molded articles. Because of these properties, hollow foamed molded articles made of a polypropylene resin as a base resin are used as, for example, air conditioner ducts for automobiles.

Although polypropylene resins have excellent balance between their heat resistance property and mechanical strength, they are ill-suited for certain applications, especially applications in which they are used in a position near high temperature heat sources or applications in which they are used for refrigerators. In such applications, there is a demand for materials having high mechanical strength over a wider temperature range.

Polycarbonate resins, on the other hand, have higher heat resistance and better mechanical properties in a low temperature environment as compared with polypropylene resins and, additionally, exhibit self-extinguishing property.

As compared with general-use resins, such as polystyrenes, which are generally used in extrusion foaming, polycarbonate resins show a higher melt viscosity and a lower melt tension at a temperature suitable for foaming in the extrusion stage and, therefore, are inferior in foamability. In a molding method, such as foam blow molding, in which a foamed parison in a softened state is molded in a mold (such a method is hereinafter occasionally referred to as "foamed parison molding"), it is necessary that the foamed parison should maintain its softened state and keep its cell structure without causing excessive drawdown until it has been molded in the mold. Therefore, a resin used in the foamed parison molding is required to have a higher quality of foamability than that required in ordinary extrusion foaming.

Hitherto, foamed blow-molded articles in which a polycarbonate resin having foaming characteristics that are not good is used as a base resin have an expansion ratio of as low as about 1.3.

In this circumstance, Patent Document 1 proposes the use of a polycarbonate resin having a specific melt tension for the purpose of obtaining a foamed blow-molded article having a lower apparent density than conventional articles without causing cell breakage or drawdown of the foamed parison.

Patent Document 2 discloses a method in which a mixture of a crosslinking agent, such as a carboxylic anhydride, and a mixed resin containing a polycarbonate resin and polyethylene terephthalate is extruded and foamed. By so doing, a cross-linking structure is introduced into the polyethylene terephthalate dispersed in the polycarbonate resin, melt characteristics of the mixed resin, such as melt viscosity, so that melt tension and elastic property, are changed to a state suited to extrusion foaming, thereby enabling to produce an extruded foamed product.

PRIOR ART

Patent Document

Patent Document 1: Japanese Patent Publication JP-A-2000-033643
Patent Document 2: Japanese Patent Publication JP-A-H11-080411

SUMMARY OF THE INVENTION

Problems to be Solved by the Invention

In view of rising concern of environmental problems in recent years, foamed molded articles, which are inherently good in light weight property, are desired to be made much more lighter in weight. In order to achieve lightness in weight, it is necessary to further increase the expansion, ratio of the foamed molded articles or to further reduce the wall thickness thereof. Mere increase of expansion ratio or decrease of the wall thickness, however, tends to cause a reduction in closed cell content of the foamed articles. An excessive reduction of the closed cell content is apt to result in considerable deterioration of the mechanical strength of the foamed articles.

Although the method disclosed in Patent Document 1 enables to obtain foamed blow-molded articles that are formed of a polycarbonate resin as a base resin and have a high expansion ratio, their closed cell content is apt to be reduced when the expansion ratio is further increased or when the cells are made fine. Thus, there is still a room for improvement with respect to achievement of a highly closed cell structure.

The method disclosed in Patent Document 2 can give good foamed articles by ordinary extrusion foaming. When the method is applied to molding of a foamed parison, however, it is not possible to obtain good foamed articles, because crystallization of polyethylene terephthalate has significantly proceeded before the foamed parison is molded in a mold cavity and because the drawing and spreading properties of the foamed parison are considerably deteriorated in the molding stage. Moreover, with the method of Patent Document 2 in which the polyester resin is cross-linked, cross-linking of the polyester resin excessively proceeds, depending upon the extrusion conditions, so that it becomes difficult to perform extrusion foaming.

On the other hand, if no cross-linking agent is used, it is not easy to foam the polyethylene terephthalate in general and, further, it is not possible to improve the foamability of the polycarbonate resin because of its poor compatibility with the polycarbonate resin. Thus, good foamed articles are not obtainable.

It is an object of the present invention to provide a method or producing a foamed molded article, such as a foamed blow-molded article, by molding, in a mold cavity, a foamed parison obtained from a base resin containing a polycarbonate resin as its main component and to provide a foamed article production method which is capable of producing a good polycarbonate resin foamed molded article over a wide range of apparent densities by improving the foamability of the polycarbonate resin substantially without causing deterioration of excellent properties, such as mechanical strength, that are inherent to the polycarbonate resin.

Means for Solving the Problems

It has been found that the above problems in the production of a polycarbonate resin foamed molded article by melting and kneading a polycarbonate resin and a foaming agent in an extruder to form a foamable molten resin, followed by extrusion of the foamable molten resin to obtain a foamed parison, and molding of the foamed parison in a softened state, can be solved when the foamed parison is formed by using a mixed resin obtained by blending the polycarbonate resin with a specific polyester. The present invention has been completed based on the above finding.

That is, the present invention has as its gist the following (1) to (8)

(1) A method for producing a polycarbonate resin foamed molded article comprising kneading a polycarbonate resin (A), a polyester resin (B) it an amount of 5 to 100 parts by weight per 100 parts by weight of the polycarbonate resin (A) and a foaming agent to obtain a foamable molten resin, extruding the foamable molten resin to obtain a foamed parison, and molding the foamed parison, which is in a softened state, in a mold, wherein the polyester resin (B) is a polyester copolymer containing diol component units, 10 to 80 mol % of which are glycol component units each having a cyclic ether structure, and dicarboxylic acid component units.

(2) The method for producing a polycarbonate resin foamed molded article according above (1), wherein the polycarbonate resin (A) has a melt viscosity of 2,000 to 6,000 Pa·s at 250° C. and at a shear rate of 100 $sec^{-1}$.

(3) The method for producing a polycarbonate resin foamed molded article according to above (1), wherein the polycarbonate resin (A) is composed of a polycarbonate resin (A1) having a melt viscosity of 2,000 to 3,000 Pa·s at 250° C. and at a shear rate of 100 $sec^{-1}$ and a polycarbonate resin (A2) having a melt viscosity of 3,500 to 6,000 Pa·s at 250° C. and at a shear rate of 100 $sec^{-1}$, a weight ratio of the resin (A1) to the resin (A2) being 90:10 to 50:50.

(4) The method for producing a polycarbonate resin foamed molded article according to above (3), wherein the polycarbonate resin (A1) has a melt tension at 250° C. of 15 cN or more (5) The method for producing a polycarbonate resin foamed molded article according to any one of above (1) to (4), wherein the polyester resin (B) has a melt viscosity of 300 to 1,500 Pa·s at 250° C. and at a shear rate of 100 $sec^{-1}$.

(6) The method for producing a polycarbonate resin foamed molded article according to any one of above (1) to (5), wherein the diol component units that constitute the polyester resin (B) comprise 15 to 50 mol of 3,9-bis(1,1-dimethyl-2-hydroxyethyl)-2,4,8,10-tetraoxaspiro[5.5]undecane component units, and 85 to 50 mol % of ethylene glycol component units, with the proviso that a total amount of the both component units is 100 mol %, and wherein the dicarboxylic acid component units that constitute the polyester resin (B) comprise terephthalic acid component units.

(7) The method for producing a polycarbonate resin foamed molded article according to any one of above (1) to (6), wherein the polyester resin (B) shows an exothermic calorific value of 5 J/g or less inclusive of 0 J/g in a DSC curve thereof obtained by heat flux differential scanning calorimetry in which the polyester resin (B) is maintained at a temperature of 300° C. for 10 minutes and thereafter gradually cooled at a cooling speed of 10° C./min.

(8) The method for producing a polycarbonate resin foamed molded article according to any one of above (1) to (7), wherein the foaming agent is an inorganic physical foaming agent.

Effect of the Invention

In a method for producing a foamed molded article including kneading a polycarbonate resin and a foaming agent to obtain a foamable molten resin, extruding the foamable molten resin through a die to obtain a foamed parison, and molding the foamed parison in a softened state in a mold, when the foamed parison is formed from a mixed resin, as its base resin, which is obtained by blending the polycarbonate resin with a polyester copolymer containing dial component units, 10 to 80 mol % of which are glycol component units each having a cyclic ether structure, and dicarboxylic acid component units, the foamability of the polycarbonate resin can be improved substantially without causing deterioration of excellent properties, such as mechanical strength, and moldability, that are inherent to the polycarbonate resin. As a consequence, it is possible to obtain a good foamed molded article having a high closed cell content and excellent appearance over a wide range of apparent densities. The foamed molded articles obtained by the method of the present invention have excellent mechanical strengths, such as bending strength and impact resistance, despite their light weight and also show excellent heat resistance and cold impact resistance that are inherent to the polycarbonate resin and, therefore, may be used for various applications such as automobile parts, electric or electronic parts, receptacles and packaging materials.

EMBODIMENTS OF THE INVENTION

A method for producing a polycarbonate resin foamed molded article according to the present invention comprises kneading a polycarbonate resin (A), a polyester resin (B) in an amount of 5 to 100 parts by weight per 100 parts by weight of the polycarbonate resin (A) and a foaming agent (i.e., blowing agent) to obtain a foamable molten resin, extruding the foamable molten resin to obtain a foamed parison, and molding the foamed parison, which is in a softened state, in a mold, wherein the polyester resin (B) is a polyester copolymer containing diol component units, 10 to 80 mol % of which are glycol component units each having a cyclic ether structure, and dicarboxylic acid component units The present invention will be described in detail below. The method for producing a foamed molded article according to the present invention comprises extruding a foamable molten resin, obtained by kneading a base resin and a foaming agent together, through a die to obtain a foamed parison, and molding the foamed parison in a softened state in a mold.

As a method for molding the foamed parison in a mold, there may be mentioned (1) a method of forming a hollow foamed molded article by so called foam blow molding, which includes placing the foamed parison between molds, blowing a compressed gas into the foamed parison to press the outer surface thereof against an inner surface of the molds to mold the foamed parison into a molded body so that the shape of the molds is replicated thereon, and (2) a method of forming a solid foamed molded article, which includes placing the foamed parison between molds, fusion-bonding at least parts of the inner surface of the foamed parison together, and compressing the foamed parison into a molded body so that the shape of the molds is replicated thereon. Both of the above methods are cumulatively referred to herein as "foamed parison molding". The hollow foamed molded article obtainable by the above method (1) and the solid foamed molded article obtainable by the above method (2) are referred to herein as "foamed molded article" or simply as "molded article".

In order to mold a parison, extruded through a die of an extruder, in a mold into a shape conforming to the shape of the mold, it is necessary that the parison be maintained in a softened state throughout the period after the parison is extruded through the die until the parison is molded in the mold. In particular, in foamed parison molding in which a foamed parison is molded, it is necessary to keep the foamed parison in a softened state while preventing breakage of its cells. It is further necessary to prevent the foamed parison from causing excessive drawdown. If the well structure is destroyed to form open cells, the moldability of the foamed parison is deteriorated so that the thickness accuracy of the molded article is lowered and, moreover, molded article with the desired shape is difficult to be obtained. Additionally, excessive drawdown may cause deformation of the cells so that the mechanical strength of such a deformed portion of the molded article is occasionally deteriorated and, moreover, the thickness accuracy of the molded article is occasionally lowered.

Excessive drawdown may be prevented by, for example, a method in which discharge rate is increased so as to form the foamed parison within a short period of time, a method in which a resin with a high melt viscosity is used as a base resin or a method in which the temperature at which the foamed parison is extruded is lowered.

Since, however, it is necessary to control the foaming temperature in a range suited for foaming in order to form a good foamed parison, the extrusion temperature is not freely determined. Additionally, too low an extrusion temperature causes solidification of the foamed parison immediately after the foaming. On the other hand, when the discharge rate is excessively raised or when a high viscosity resin is used, excessive generation of shear heat is apt to occur, so that there is undesirably a possibility of formation of open cells in the foamed parison or of shrinkage of the foamed parison before molding.

Therefore, in foamed parison molding in which a polycarbonate resin foamed parison is molded in a mold, especially in foam blew molding, a method to improve the foamability of the polycarbonate resin is important for obtaining good foamed molded articles.

In the present invention, it becomes possible to improve the foamability of a foamed parison by extruding a mixed resin, which is obtained by blending a polycarbonate resin with a polyester copolymer (herein referred to as polyester resin (B)) containing diol component units, 10 to 80 mol % of which are glycol component units each having a cyclic ether structure, and dicarboxylic acid component units. As a consequence of the improvement in foamability, it is possible to maintain the cell structure of the foamed parison in a softened state and to prevent the shrinkage thereof. Therefore, it is possible to obtain a molded article having a high closed cell content and an excellent surface state even when the apparent density thereof is low. Improvement of the foamability also enables to produce a molded article having a high closed cell content and, accordingly, excellent mechanical strength, even when the cell diameter thereof is made smaller than conventional polycarbonate resin foamed molded articles.

Although the reason for achievement of the improved foamability of the foamed parison by blending a polycarbonate resin with the above polyester resin (B) is not clear, it is considered that, because glycol component units each having a cyclic ether structure are contained in the polyester resin (B) in a specific amount, the polyester resin (B) is present in a finely dispersed state in the polycarbonate resin so that melt characteristics of the polycarbonate resin are altered to those Which are suited for the formation of a foamed parison. Incidentally, the fact that the compatibility of the polycarbonate resin and the polyester resin (B) is good may be appreciated from the fact that a mixture of these resins shows only one glass transition temperature.

From the above point of view, the lower limit of the content of the glycol component units each having a cyclic ether structure in the diol component units that constitute the polyester resin (B) is preferably 15 mol %, more preferably 20 mol %, still more preferably 25 mol %. The upper limit is, on the other hand, preferably 50 mol %, more preferably 45 mol %, still more preferably 40 mol %.

In the present invention, the blending amount of the polyester resin (B) relative to the polycarbonate resin (A) is 5 to 100 parts by weight per 100 parts by weight of the polycarbonate resin (A). When the blending amount of the polyester resin (B) is excessively small, it is not possible to obtain the effect of improving the foamability of the polycarbonate resin. From this view point, the blending amount of the polyester resin (B) is preferably at least 10 parts by weight, more preferably at least 15 parts by weight. When the blending amount of the polyester resin (B) is large, on the other hand, the effect of improving the foamability of the polycarbonate resin may be sufficiently obtained. However, too large a blending amount may cause a possibility that the heat resistance and mechanical strength of molded articles are not fully satisfactory depending upon the intended use thereof. From this view point, the blending amount of the polyester resin (B) is preferably 80 parts by weight or less, more preferably 60 parts by weight or less, still more preferably 45 parts by weight or less.

The polyester used in the present invention is a polyester copolymer containing dial component units, 10 to 80 mol % of which are glycol component units each having a cyclic ether structure, and dicarboxylic acid component units. From the standpoint of achievement of the object of the present invention, it is preferred that the glycol component units each having a cyclic ether structure be glycol component units each having a cyclic acetal structure The dial having a cyclic ether structure, which is one of the components of the raw material monomers for the polyester resin (B) used in the present invention, is preferably a compound represented by the general formula (1) or (2) shown below. Such a compound may be produced from a hydroxyaldehyde that may be of various types, and pentaerythritol, trimethylolpropane, etc. in the presence of an acid catalyst.

[Chemical Formula 1]

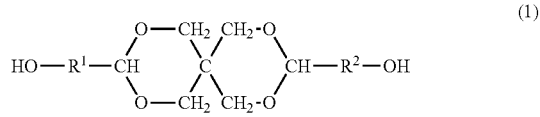

In the formula (1), $R^1$ and $R^2$ each independently represent a characteristic group selected from noncyclic hydrocarbon groups each having 1 to 10 carbon atoms, alicyclic hydrocarbon groups each having 3 to 10 carbon atoms and aromatic hydrocarbon groups each having 6 to 10 carbon atoms, and are each preferably, for example, a methylene group, an ethylene group, a propylene group, a butylene group or a structural isomer thereof such as an isopropylene group or an isobutylene group.

[Chemical Formula 2]

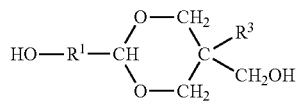

(2)

In the formula (2), $R^1$ has the same meaning as above and $R^3$ represents a characteristic group selected from noncyclic hydrocarbon groups each having 1 to 10 carbon atoms, alicyclic hydrocarbon groups each having 3 to 10 carbon atoms and aromatic hydrocarbon groups each having 6 to 10 carbon atoms, and is preferably, for example, a methyl group, an ethyl group, a propyl group, a butyl group or a structural isomer thereof such as an isopropyl group or an isobutyl group.

Specific examples of the compound of the general formula (1) include 3,9-bis(1,1-dimethyl-2-hydroxyethyl)-2,4,8,10-tetraoxaspiro[5.5]undecane, which will be hereinafter occasionally referred to as "spiroglycol". Specific examples of the compound of the general formula (2) include 5-methylol-5-ethyl-2-(1,1-dimethyl-2-hydroxyethyl)-1,3-dioxane and 2-(5-ethyl-5-hydroxymethyl-1,3-dioxane-2-yl)-2-methyl-propane-1-ol.

In the present invention, it is preferred that the polyester resin (B) be, among others, a polyester copolymer which comprises, as its diol component units, 15 to 50 mol % of spiroglycol component units and 85 to 50 mol % of ethylene glycol component units (with the proviso that a total amount of the both component units is 100 mol %), and, as its dicarboxylic acid component units, terephthalic acid component units. The terephthalic acid component units are preferably formed by copolymerization of a terephthalic acid ester and a diol component. Examples of such a terephthalic acid ester include dimethyl terephthalate, dipropyl terephthalate, diisopropyl terephthalate, dibutyl terephthalate and dicyclohexyl terephthalate.

The polyester resin (B) used in the invention is preferably a polyester copolymer containing, as its diol components, 20 to 50 mol % of spiroglycol component units and 80 to 50 mol % of ethylene glycol component units, more preferably 30 to 40 mol % of spiroglycol component units and 70 to 60 mol % of ethylene glycol component units.

In the present invention, the polyester resin (B) may additionally contain a small amount of other diol component units than the glycol component units each having a cyclic ether structure and the ethylene glycol component units.

Such additional diol component units are not particularly limited, and examples thereof include diol component units derived from: aliphatic diols such as trimethylene glycol, 2-methylpropanediol, 1,4-butanediol, 1,5-pentanediol, 1,6-hexanediol, diethylene glycol, triethylene glycol, propylene glycol and neopentyl glycol; polyether compounds such as polyethylene glycol, polypropylene glycol and polybutylene glycol; trihydric or higher polyhydric alcohols such as glycerin, trimethylolpropane and pentaerythritol; alicyclic diols such as 1,3-cyclohexanedimethanol, 1,4-cyclohexanedimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane and pentacyclododecane dimethanol; alkylene oxide adducts of bisphenols such as 4,4'-(1-methylethylidene)bisphenol, methylenebisphenol (bisphenol F), 4,4'-cyclohexylidenebisphenol (bisphenol Z) and 4,4'-sulfonylbisphenol (bisphenol S); and alkylene oxide adducts of aromatic dihydroxy compounds such as hydroquinone, resorcin, 4,4'-dihydroxybiphenyl, 4,4-dihydroxydiphenyl ether and 4,4'-dihydroxydiphenylbenzophenone. The content of such additional diol component units is preferably not greater than 10 mol % based on the whole diol component units.

In the present invention, the polyester resin (B) may additionally contain the dicarboxylic acid component units than the terephthalic acid component units. Examples of the dicarboxylic acid usable other than terephthalic acid include isophthalic acid, phthalic acid, 2-methylterephthalic acid, naphthalenedicarboxylic acid, biphenyldicarboxylic acid, tetralindicarboxylic acid, succinic acid, glutaric acid, adipic acid, pimelic acid, suberic acid, azelaic acid, sebacic acid, dodecadicarboxylic acid, cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetraoxaspiro[5.5]undecane, trimellitic acid, trimesic acid, pyromellitic acid, tricarballylic acid and dicarboxylic acids derived from esters thereof. The content of such additional dicarboxylic acid component units is preferably not greater than 20 mol % based on the whole dicarboxylic acid component units.

A method for producing the polyester resin (B) used in the present invention is not specifically limited and any conventionally known method may be adopted. Examples of the method include a melt polymerization and a solution polymerization method such as a transesterification method and a direct esterification method. As transesterification catalysts, esterification catalysts, etherification inhibitors, polymerization catalysts for use in polymerization, stabilizers including heat stabilizers and light stabilizers, and polymerization regulators, there may be used any conventionally known ones. Examples of the transesterification catalyst include compounds of manganese, cobalt, zinc, titanium or calcium. Examples of the esterification catalyst include compounds of manganese, cobalt, zinc, titanium or calcium. Examples of the etherification inhibitor include amine compounds. Examples of the polycondensation catalyst include compounds of germanium, antimony, tin or titanium. Addition of a heat stabilizer which may be various types of phosphorus compounds such as phosphoric acid, phosphorous acid and phenylphosphonic acid is effective. In addition, a light stabilizer, an antistatic agent, a lubricant, an antioxidant, a mold release agent or the like additive may be added.

The polycarbonate resin used in the present invention refers to a polycarbonic acid ester that may be formed from carbonic acid and a glycol or a bisphenol and may be suitably selected from those polycarbonate resins derived from a bisphenol such as 2,2-bis(4-hydroxyphenyl)propane (bisphenol A), 2,2-bis(4-hydroxyphenyl)butane, 1,1-bis(4-hydroxyphenyl)cyclohexane, 1,1-bis(4-hydroxyphenyl)isobutane, 1,1-bis(4-hydroxyphenyl)ethane.

It is preferred that the polycarbonate resin (A) used in the present invention have a melt viscosity at 250° C. and at a shear rate of 100 sec$^{-1}$ (hereinafter referred to as melt viscosity η(a)) of 2,000 to 6,000 Pa·s, more preferably 2,000 to 4,000 Pa·s. When the melt viscosity η(a) is excessively low, drawdown of a foamed parison becomes significant so that there is a possibility that the thickness accuracy of the obtained foamed molded article is deteriorated. When the melt viscosity η(a) is excessively high, on the other hand, it becomes difficult to increase the discharge rate of the foamed parison so that there is a possibility that the foamed parison partly solidifies before the start of molding to cause molding failure. Further, if the discharge rate is forcibly increased in a case where the melt viscosity η(a) is excessively high, excessive shear heat generation occurs within the die to cause a reduction of foamability, formation of open cells and shrinkage, so that there is a possibility that problems such as reduction of mechanical strength and deterioration of appearance are brought about. Thus, when melt viscosity η(a) is within the above-described range, the foamed parison has particularly excellent foamability and moldability.

In the present invention, it is preferred that a polycarbonate resin (A1) having a low viscosity and a polycarbonate resin (A2) having a high viscosity be used together to form the polycarbonate resin (A). By using low viscosity and high viscosity polycarbonates in combination, it is possible to broadening the temperature range suited for foaming while suppressing drawdown of the foamed parison. When the resins (A1) and (A2) are used in combination, the melt viscosity of the polycarbonate resin (A1) at 250° C. and at a shear rate of 100 sec$^{-1}$ (hereinafter referred to as melt viscosity η(a1)) is preferably 2,000 to 3,000 Pa·s, while the melt viscosity of the polycarbonate resin (A2) at 250° C. and at a shear rate of 100 sec$^{-1}$ (hereinafter referred to as melt viscosity η(a2)) is preferably 3,500 to 6,000 Pa·s.

A blending ratio (A1:A2) by weight of the polycarbonate resin (A1) to the polycarbonate resin (A2) being 90:10 to 50:50, more preferably 85:15 to 60:40.

From the standpoint of improved foamability, the polycarbonate resin (A1) preferably has a melt tension of 15 cN or more, more preferably 17 to 40 cN, still more preferably 18 to 30 cN.

The melt tension may be measured using, for Capirograph 1D (manufactured by TOYO Seiki Seisaku-Sho, Ltd.). Concretely, in a cylinder having a cylinder diameter of 9.55 mm and a length of 350 mm is set an orifice having a nozzle diameter of 2.095 mm and a length of 8.0 mm. The cylinder and the orifice are set at a temperature of 250° C. A fully dried specimen (polycarbonate resin) in a required amount is charged into the cylinder and an extruding piston is inserted into the cylinder. This is then held for 4 minutes to melt the specimen. The molten resin is then extruded in the form of a string through the orifice at a piston speed of 10 mm/minute. The extruded string is put on a tension-detecting pulley having a diameter of 45 mm and is taken up on a take-up roller while increasing the take-up speed at a constant take-up acceleration rate such that the take-up speed increases from 0 m/minute to 200 m/minute through a period of 4 minutes to measure the maximum tension immediately before the string breaks. The reason for adopting a time period of 4 minutes until the take-up speed reaches 200 m/minute from 0 m/minute is to suppress thermal deterioration of the resin and to improve the reproducibility of the measured values. The above measurement is carried out for ten different samples. From the obtained ten measured maximum values, the largest three values and the smallest three values are extruded. The arithmetic mean of the rest four maximum values is the melt tension (cN) as used for the purpose of the present invention.

When the resin string does not break up to the take-up speed of 200 m/minute in the above method for the measurement of the melt tension, then the melt tension (cN) is as measured by the take-up operation at a constant take-up speed of 200 m/minute. More concretely, in the same manner as that described above, the molten resin is extruded from the orifice in the form of a string, and the extruded resin string is put on a tension-detecting pulley and taken up on a take-up roller while increasing the take-up speed at a constant take-up acceleration rate such that the take-up speed increases from 0 m/minute to 200 m/minute through a period of 4 minutes. When the take-up speed of 200 m/minute is reached, recording of the melt tension data is started and continued for 30 seconds. From the obtained tension load curve for a measuring period of 30 seconds, the arithmetic mean (Tave) of the maximum tension (Tmax) and minimum tension (Tmin) is the melt tension as used for the purpose of the present invention. The Tmax as used herein is a value obtained by dividing a sum of the tension values of the peaks detected in the tension load curve by the number of the peaks, while the Tmin as used herein is a value obtained by dividing a sum of the tension values of the dips detected in the tension load curve by the number of the dips. The above measurement should be carried out such that inclusion of air bubbles in the string is prevented as much as possible at the time of extrusion of the molten resin in the string form through the orifice.

A viscosity increasing agent may be added to the polycarbonate resin (A) used in the present invention for controlling the viscosity thereof. Addition of the viscosity increasing agent to a low viscosity polycarbonate resin, such as a recycled material thereof, for controlling the viscosity thereof is particularly effective. The viscosity increasing agent used for this purpose is not specifically limited and may be any conventionally known one. Examples of the viscosity increasing agent include acid dianhydrides, metal compounds, polyfunctional epoxy compounds, oxazoline compounds and oxazdine compounds. Above all, polyfunctional epoxy compounds are preferred.

It is preferred that the polyester resin (B) used in the present invention have a melt viscosity at 250° C. and at a shear rate of 100 sec$^{-1}$ (hereinafter referred to as melt viscosity η(b)) of 300 to 1,500 Pa·s. When the melt viscosity η(b) is within the above range, the effect of suppressing shear heat generation at the time of extrusion is improved and excellent foamability may be obtained.

The melt viscosity of the polycarbonate resin (A) and polyester resin (B) is measured with an orifice diameter of 1 mm and an orifice length of 10 mm at a measuring temperature of 250° C. and at a shear rate of 100 sec$^{-1}$ using a measuring device such as Capirograph 1D (manufactured by Toyo Seiki Seisaku-Sho, Ltd.)

It is preferred that the polyester resin (B) show an exothermic peak with a calorific value of 5 J/g or less (inclusive of 0 J/g) in its DSC curve obtained by heat flux differential scanning calorimetry in accordance with JIS K7122-1957 in which the resin is heated to 300° C. at a heating speed of 10° C./min, maintained at 300° C. for 10 minutes and then cooled at a cooling speed of 10° C./mm. The fact that the exothermic peak has a low calorific value or no exothermic peak is observed indicates that the polyester resin (B) almost does not crystallize or does not at all crystallize under the above described cooling conditions and, thus, means that the polyester resin (B) has an extremely low crystallization speed or the polyester resin (B) is non-crystalline or extremely low-crystalline in nature. When the calorific value of the exothermic peak is 5 J/g or less, the foamed parison exhibits excellent foamability. From this point of view, the calorific value of the exothermic peak is more preferably 3 J/g or less (inclusive of 0 J/g), still more preferably 0 J/g.

Incidentally, the maintenance temperature of 300° C. is adopted in view of the fact that the polyester resin (B) used in the present invention does not always shows a clear melting point. The nitrogen flow rate is 30 mL/min.

It is also preferred that the polyester resin (B) used in the present invention has a glass transition temperature of 90° C. or more. When the glass transition temperature is high, the polycarbonate resin can exhibit its inherent heat resistance so that the obtained foamed molded article shows excellent heat resistance. From this point of view, the glass transition temperature of the polyester resin (B) is more preferably 9%° C. or more, still more preferably 100° C. or more. The upper limit of the glass transition temperature is generally about 130° C. although, from the standpoint of the heat resistance alone, the upper limit is not specifically limited thereto.

The glass transition temperature as used herein is a temperature as measured by heat flux differential scanning calorimetry in accordance with JIS K7121-1987 using conditions as described at Paragraph 3, "Measurement glass transition temperature after heat treatment under specified conditions". The nitrogen flow rate is 30 mL/min.

As the foaming agent used in the invention, there may be Mentioned a physical foaming agent and/or a chemical foaming agent. Preferably, a physical foaming agent is used by itself, or a composite foaming agent containing a physical foaming agent and a chemical foaming agent is used.

Examples of the physical foaming agent include aliphatic hydrocarbons such as propane, n-butane, i-butane, n-pentane, i-pentane, n-hexane and i-hexane; alicyclic hydrocarbons such as cyclobutane, cyclopentane and cyclohexane; halogenated hydrocarbons such as methyl chloride, ethyl chloride, 1,1,1,2-tetrafluoroethane and 1,1-difluoroethane; alcohols such as methanol and ethanol; ethers such as dimethyl ether, diethyl ether and ethyl methyl ether; carbon dioxide; nitrogen; argon; and water. Examples of the chemical foaming agent include azodicarbonamide, sodium bicarbonate and a mixture of sodium bicarbonate and citric acid. These foaming agents may be used alone or in the form of a mixture of two or more thereof.

Among the above foaming agents, the use of an inorganic physical foaming agent is preferred for the purpose of the present invention. It is more preferred that a physical foaming agent contain 50 to 100 mol % of carbon dioxide (the foaming agent may consist only of carbon dioxide) because of reduced cycle time and improved dimensional stability of the hollow foamed blow-molded article. It is particularly preferred that the foaming agent be composed only of a physical foaming agent such as carbon dioxide.

A cell controlling agent such as talc may be incorporated into the base resin that comprises the polycarbonate resin (A) and the polyester resin (B). The cell controlling agent may be used in the form of a master batch. The cell controlling agent is generally used in an amount of 0.05 to 10 parts by weight per 100 parts by weight of the base resin.

In the present invention, the base resin including the polycarbonate resin (A) and the polyester resin (B) is kneaded in an extruder together with a foaming agent and, if necessary a cell controlling agent such as talc to obtain a foamable molten resin. The foamable molten resin is controlled to have a resin temperature that is suited for foaming and is extruded in the form of a tube to obtain a foamed parison. When a physical foaming agent is used as the foaming agent, it is supplied to the molten resin in the extruder by injection.

Among foamed molded articles obtained by the method of the present invention, a hollow foamed molded article obtained by molding preferably has an average thickness of 0.3 to 20 mm, more preferably 0.5 to 15 mm, still more preferably 1 to 10 mm.

The foamed molded article obtained by the method of the present invention may have a multilayer structure composed of foamed resin layer and a non-foamed resin layer. In this case, such a non-foamed resin layer may be provided on both or either of the inner and outer surfaces of a foamed layer or a foamed parison in the production stage of the foamed molded article. Alternatively, the multilayer structure may be constituted such that a non-foamed resin layer is interposed between foamed layers, namely constituted into a foamed layer/non-foamed layer/foamed layer arrangement. In a hollow foamed molded article obtained by blow molding a foamed parison that has a non-foamed resin layer on its outer surface, the non-foamed resin layer is positioned on an outer surface of the foamed molded article, without the inner surface being the non-foamed resin layer. The non-foamed resin layer preferably has a thickness of 0.05 to 3 mm, more preferably 0.25 to 1.5 mm.

An additive or additives such as a flame retardant, fluidity improver, a UV absorber, an electrical conductivity imparting agent, a colorant, a thermal stabilizer, an antioxidant and an inorganic filler may be incorporated into the base resin that constitutes the foam layer or the surface layer or of the foamed parison of the present invention, as needed.

The thickness of the hollow molded article obtained by the method of the present invention is measured on a vertical cross-section along a plane perpendicular to the longitudinal direction in each of three (3) positions including a position near the midpoint in the longitudinal direction thereof and two positions near both ends thereof. In each of these three positions, thickness measurement is done at five (5) locations which are equally spaced from each other. From the thus obtained 15 measured values, the maximum and minimum values are excluded. The average thickness is the arithmetic mean of the remaining thirteen (13) measured thickness values.

The foamed molded article produced by the method of the present invention preferably has an apparent density of 0.08 to 0.8 g/cm$^3$, more preferably 0.1 to 0.4 g/cm$^3$. When the apparent density is within the above range, the foamed molded article shows a good balance between the mechanical property (e.g., bending strength and compressive strength) lightness in weight and thermal insulation property. As used herein, the term "apparent density" of the foamed molded article refers to a density calculated by dividing the weight (g) of the foamed molded article by the volume (cm$^3$) thereof.

The foamed molded article. Produced by the method of the present invention preferably has a closed cell content of 50% or more, more preferably 60% or more, still more preferably 70% or more, particularly preferably 80% or more. When the closed call content is within the above range, the molded article can sufficiently exhibit excellent mechanical strength, such as bending strength and compressive strength, which is inherent to polycarbonate resins, even if the molded article is made to have a light weight by increasing the expansion ratio or by decreasing the wall thickness.

As used herein, the closed well content refers to a value as calculated by the formula (1) below upon determining Vx of a specimen, cut out from a molded article, according to Procedure C of ASTM D-256-70 (reapproved 1976). In this case, when the required volume cannot be obtained from one sample, a plurality of samples may be combined together to get as close the required volume as possible.

[Formula 1]

$$\text{Closed cell content (\%)} = (Vx - Va(\rho f/\rho s)) \times 100/(Va - Va(\rho f/\rho s)) \quad (1)$$

wherein $Vx$ represents a true volume (cm$^3$) of the specimen, which corresponds to a sum of a volume of the resin and a volume of closed cells, $Va$ represents an apparent volume (cm$^3$) of the specimen which is calculated from the outer dimension thereof, ρf represents an apparent density (g/cm³) of the specimen, and ρs represents a density (g/cm³) of the base resin constituting the specimen.

The foamed molded article produced by the method of the present invention preferably has an average cell diameter in the thickness direction of 50 to 800 μm, more preferably 100 to 500 μm. The foamed molded article, which has an average cell diameter within the above range, can sufficiently exhibit excellent mechanical strength, such as bending strength and compressive strength, that is inherent to polycarbonate resins.

As used herein, the average cell diameter in the thickness direction of a foamed molded article refers to average cell diameter as measured by the following method. A vertical cross section taken in the direction perpendicular to the longitudinal direction (extrusion direction) of the foamed molded article is magnified and projected. On the projected image, a straight line extending through the entire thickness of the foamed molded article is drawn. The number of cells that intersect this straight line is counted. The value computed by dividing the real length before magnification of this straight line on the projected image by the count of the number of cells represents the cell diameter in the thickness direction of the molded article. The above measurement is carried out for the vertical cross section of each of the three (3) positions including a position near the midpoint in the longitudinal direction thereof and two positions near both ends thereof (a position where the foamed molded article has a special shape, such as a location designed for fitting engagement, should be avoided). In each of these three cross sections, measurement is done at equally spaced apart five (5) locations (five locations equally spaced from each other in the peripheral direction (along the perimeter) thereof in the case of a hollow foamed molded article; or five locations equally spaced in the lateral direction in the case of a solid foamed molded article) The average cell diameter in the thickness direction of the molded article is the arithmetic mean of the thirteen (13) measured cell diameter values excluding the maximum and minimum values of the obtained 15 measured values.

The method of the present invention enables to easily produce polycarbonate resin foamed molded articles having a high closed cell content over a wide range of its apparent density. With the conventional processes, it has been difficult to produce a foamed molded article having a high closed cell content and a high expansion ratio of an apparent density of less than 0.2 g/cm³. With the method of the present invention, on the other hand, it is possible to produce a foamed molded article having a closed cell content of 50% or higher even when the apparent density thereof is less than 0.2 g/cm³. Further, a reduction of the average cell diameter of a foamed molded article generally tends to increase an open cell content because of excessive reduction of the cell walls. In contrast, the method of the present invention makes it possible to produce a foamed molded article having a closed cell content of 50% or higher over a wide range of its apparent density, in case of the cell diameter is small, even when the average cell diameter is 500 μm or less.

In the method of the present invention, the apparent density, closed cell content and other properties of foamed molded articles may be controlled by adjustment of the using amount of the physical foaming agent and of the discharge rate and the resin temperature at the time the foamable molten resin composition is extruded through a die.

Namely, as the amount of the physical foaming agent increases, the average density of the foamed molded article tends to decrease. The amount of the physical foaming agent is generally properly determined in consideration of the desired expansion ratio and the kind of the foaming agent. When carbon dioxide is used as the foaming agent, for example, the amount thereof is preferably 0.1 to 1 mole per 1 kg of the base resin in order to obtain a foamed molded article having an apparent density of 0.08 to 0.8 g/cm³. When the discharge rate is excessively high, cells of the foamed parison are apt to open due to shear heat generation. On the other hand, too slow a discharge rate will cause so-called premature foaming in the die and, hence, will result in formation of open cells. Even when such premature foaming does not occur, there is still a possibility that the resin may solidify during extrusion so that open cells are formed during the molding stage in a mold. Thus, the discharge rate is preferably about 10 to 100 kg/h·cm². The resin temperature at which extrusion of the foamed parison is carried out is preferably about 220 to 240° C.

EXAMPLES

The following examples will further illustrate the present invention. It should be noted, however, that the present invention is not limited to the following examples. The polycarbonate resins and polyester resins used in the Examples and Comparative Examples are as follows.

Polycarbonate Resin:

Three types of polycarbonate resins PC1, PC2 and PC3 shown in Table 1 are used.

TABLE 1

| Abbreviation | Maker | Grade | Melt tension (cN) | Melt viscosity (Pa·s) |
|---|---|---|---|---|
| PC1 | Mitsubishi Engineering-Plastics Corporation | NOVALEX M7027BF | 22 | 4,700 |
| PC2 | *1 | — | 17 | 3,000 |
| PC3 | *2 | — | 23 | 2,800 |

*1: PC 2 is a product obtained by repelletizing PC 1, using a twin screw extruder which has an inside diameter of 47 mm and which is operated at an extruder setting temperature of 280° C. and a discharge rate of 30 kg/hr.
*2: PC 3 is a product obtained by the following method. PC 1 is mixed with 0.5% by weight of a branching agent (ARUFON UG-4035 manufactured by Toagosei Co., Ltd.) and is repelletized using a twin screw extruder which has an inside diameter of 47 mm and which is operated at an extruder setting temperature of 280° C. and a discharge rate of 30 kg/hr. The obtained product is again repelletized at an extruder setting temperature of 280° C. and a discharge rate of 30 kg/hr.

Polyester Resin:

Polyester resins used are as shown in Table 2

TABLE 2

| Abbreviation | Maker | Grade | Composition Diol component (molar ratio) | Composition Dicarboxylic acid component (molar ratio) | Melt viscosity (Pa·s) | Calorific value of DSC Exothermic peak (J/g) | Glass transition temperature (° C.) |
|---|---|---|---|---|---|---|---|
| SPET30L | Mitsubishi Gas Chemical Company, Inc.. | ALTESTER30L | EG/SPG = 70/30 | Terephthalic acid = 100 | 500 | 0 | 103 |

TABLE 2-continued

| Abbreviation | Maker | Grade | Composition Diol component (molar ratio) | Dicarboxylic acid component (molar ratio) | Melt viscosity (Pa·s) | Calorific value of DSC Exothermic peak (J/g) | Glass transition temperature (°C.) |
|---|---|---|---|---|---|---|---|
| SPET20L | Mitsubishi Gas Chemical Company, Inc.. | ALTESTER20L | EG/SPG = 80/20 | Terephthalic acid = 100 | 500 | 0 | 97 |
| SPET45L | Mitsubishi Gas Chemical Company, Inc.. | ALTESTER45L | EG/SPG = 55/45 | Terephthalic acid = 100 | 700 | 0 | 111 |
| SPET30 | Mitsubishi Gas Chemical Company, Inc.. | ALTESTER30 | EG/SPG = 70/30 | Terephthalic acid = 100 | 1,000 | 0 | 103 |
| PET1 | INVISTA | 1011E | EG = 100 | Terephthalic acid/Isophthalic acid = 94/6 | Not measurable | 25 | 80 |
| PET2 | Japan Unipet Co., Ltd. | RT553 | EG = 100 | Terephthalic acid = 100 | Not measurable | 40 | 78 |
| PET3 | Eastman Chemicals | GN001 | EG/CHDM = 67/33 | Terephthalic acid = 100 | 400 | 0 | 83 |

In Table 2, abbreviations of diol components are as follows:
EG: Ethylene glycol
SPG: Spiroglycol
CHDM: 1,4-Cyclohexanedimethanol The melt viscosity at 250° C. and at a shear rate of 100 sec$^{-1}$ and melt tension at 250° C. of the polycarbonate resins and polyester resins were measured according to the method described previously using, as a measuring device, Capirograph 1D (manufactured by Toyo Seiki Seisaku-Sho, Ltd.) after the raw material pellets had been dried at 120° C. for 12 hours. The calorific value of the exothermic peak in DSC curves was measured by the above-described method according to JIS K7122-1987.

The physical properties of the foamed molded articles were measured by the following methods.

(1) Glass Transition Temperature:

The glass transition temperature of the foamed molded articles was measured by the above-described method according to JIS K7121-1987.

(2) Melt Viscosity

The melt viscosity of the foamed molded articles was measured in the same manner as that for measuring the above-described melt viscosity of the raw material pellets except that the measurement samples were cut out from the foamed molded articles after they had been dried at 120° C. for 12 hours. The melt viscosity is as measured at a measuring temperature of 250° C. and at a shear rate of 100 sec$^{-1}$.

(3) Density (Apparent Density)

The apparent density of the foamed molded articles was calculated by dividing the weight (q) of thereof by the volume (cm$^3$) thereof which was measured by immersing each foamed molded article in water.

(4) Average Thickness

The average thickness of the foamed molded articles was measured by the previously described method.

(5) Closed Cell Content

As a measuring device, Air Comparison Pycnometer (Model-930) manufactured by Toshiba Beckmann Inc. was used. In each of the three positions that were subjected to the above-described wall thickness measurement of the foamed molded article, the closed cell content was measured according to the measuring method described previously. An arithmetic mean of the measured values is the closed cell content of the foamed molded article.

(6) Average Cell Diameter in the Thickness Direction

The average cell diameter in the thickness direction of the molded articles was determined by the method described previously. The average cell diameter was measured on each of the three vertical cross sections that were subjected to the above-described wall thickness measurement of the foamed molded article. Each cross section was magnified by 50 folds and projected. The average cell diameters were measured on the projected images.

(7) Impact Resistance (Charpy Impact Strength)

The impact strength was evaluated by measuring Charpy impact strength in accordance with JIS K7111-1996. Test pieces were cut out from the foamed molded articles at their flat portions. The test temperature was 23° C. and classification of the test method was according to ISO179/1eA. The impact strength test was carried out for five test pieces that were cut out from different locations of each foamed molded article. An arithmetic mean of the five obtained impact strength values represents the Charpy impact strength.

(B) Heat Resistance (Heat Sag Value)

The heat resistance was evaluated in accordance with JIS K7195-1993, "Heat Sag Test of Plastics". A test piece with a length of 125 mm, a width of 10 mm and a thickness equal to that of the molded article was cut out from each foamed molded articles at its flat portion. The heat sag value was determined in such a manner that the test piece, on which a weight of 5 g was placed at its tip, was maintained at 130° C. for 1 hour. The heat sag test was carried out for five test pieces that were cut out from different locations of each foamed molded article. An arithmetic mean of the five obtained measurement values represents the index of the heat resistance. The smaller the heat sag value, the better is the heat resistance.

(9) Appearance

The appearance was evaluated according to the following criteria:
Good: No surface roughness was observed on the surface of the foamed molded article
Poor: Significant surface roughness observed on the surface of the foamed molded article Examples 1 to 13

Molds for forming a hollow molded article in the form of a duct having a maximum length of 650 mm and a maximum width of 150 mm were used.

Polycarbonate resins, polyester resins and talc (Trade name HI-Filler #12 manufactured by Matsumura Sangyo Co., Ltd.) as a cell controlling agent (amounts and kinds were as shown in Table 3) were supplied to an extruder having a diameter of 65 mm and melted and kneaded in the extruder set at a temperature of 280° C.

Carbon dioxide ($CO_2$) was then injected in an amount as shown in Table 3 (mol/kg per 1 kg of the base resin) from an intermediate portion of the extruder and kneaded to form a foamable molten resin. This was cooled to a temperature suited for foaming and charged into an accumulator directly connected to the extruder. The foamable molten resin was then extruded through a circular die having a diameter of 70 mm, provided at a tip of the accumulator, and allowed to foam, thereby forming a foamed parison.

While blowing pre-blow air into the foamed parison, the foamed parison was clamped between two mold halves disposed just beneath the die. Blow air was then blown into the foamed parison from a blow pin, while evacuating the outer surface side of the foamed parison through vents provided in the molds, so that the outer surface of the foamed parison was pressed against the inner surface of the molds to blow-mold the foamed parison. After cooling, the molds were opened and the foamed molded product was taken out of the molds. Protruding fins and pocket portions were removed from the molded product to give a hollow foamed molded article.

Parison forming conditions including the discharge rate, lip clearance, discharge rate per unit area of the die lip opening and the surface temperature of the foamed parison at the time of extrusion are summarized in Table 3. The surface temperature of the foamed parison was measured before carrying out the blow molding of the foamed parison. Thus, the foamed parison, immediately after having been extruded from the die, was measured for its surface temperature at a position 100 mm below the tip of the die using an IR thermometer (Model SK-8700II manufactured by Sato Keiryoki Mfg. Co., Ltd.). The distance between the surface of the parison and the thermometer was 50 mm. The obtained foamed molded articles were each measured for the glass transition temperature, melt viscosity, density, average thickness, closed cell content, average cell diameter in the thickness direction (which is referred to as "average cell diameter" in Table), Charpy impact strength at 23° C. and heat sag value and were each evaluated for their appearance. The results are summarized in Table 4.

Comparative Example 1

A hollow foamed molded article was obtained in the same molding conditions as those in Example 1 except that the polyester resin was not used. The obtained foamed molded article was evaluated in the same manner as that in the above Examples. The production conditions were as summarized in Table 3 and the evaluation results were as summarized in Table 4.

Comparative Examples 2 to 4

Hollow foamed molded articles were obtained in the same molding conditions as those in Example 1 except that PET1 (Comparative Example 2), PET2 (Comparative Example 3) and PET3 (Comparative Example 4), that did not satisfy the requirements of the polyester resin (B) of the present invention, were used as the polyester resin. The obtained foamed molded articles were evaluated in the same manner as that in Example 1. The production conditions were as summarized in Table 3 and the evaluation results were as summarized in Table 4. In Tables 3 and 4, "Ex." means "Example" and "Comp." means "Comparative Example".

TABLE 3

| | Foamable molten resin | | | | | | |
|---|---|---|---|---|---|---|---|
| | Polycarbonate resin | Polyester resin | | Cell controlling agent | | Blowing agent | |
| | Kind | Kind | Amount part (wt) | Kind | Amount part (wt) | Kind | Amount mol/kg |
| Ex. 1 | PC1/PC2 = 20/80 | SPET30L | 12 | talc | 0.05 | $CO_2$ | 0.34 |
| Ex. 2 | PC1/PC2 = 20/80 | SPET30L | 25 | talc | 0.05 | $CO_2$ | 0.34 |
| Ex. 3 | PC1/PC2 = 20/80 | SPET30L | 42 | talc | 0.05 | $CO_2$ | 0.34 |
| Ex. 4 | PC1/PC3 = 20/80 | SPET30L | 12 | talc | 0.05 | $CO_2$ | 0.34 |
| Ex. 5 | PC1/PC3 = 20/80 | SPET30L | 25 | talc | 0.05 | $CO_2$ | 0.34 |
| Ex. 6 | PC1/PC3 = 20/80 | SPET30L | 42 | talc | 0.05 | $CO_2$ | 0.34 |
| Ex. 7 | PC1/PC3 = 20/80 | SPET20L | 12 | talc | 0.05 | $CO_2$ | 0.34 |
| Ex. 8 | PC1/PC3 = 20/80 | SPET45L | 12 | talc | 0.05 | $CO_2$ | 0.34 |
| Ex. 9 | PC1/PC3 = 20/80 | SPET30L | 12 | talc | 0.05 | $CO_2$ | 0.34 |
| Ex. 10 | PC1/PC3 = 20/80 | SPET30L | 12 | talc | 0.05 | $CO_2$ | 0.23 |
| Ex. 11 | PC1/PC3 = 20/80 | SPET30 | 12 | talc | 0.05 | $CO_2$ | 0.34 |
| Ex. 12 | PC1/PC3 = 20/80 | SPET30L | 12 | talc | 0.05 | $CO_2$ | 0.17 |
| Ex. 13 | PC3 = 100 | SPET30L | 25 | talc | 0.05 | $CO_2$ | 0.34 |
| Comp. 1 | PC1/PC2 = 20/80 | — | — | talc | 0.05 | $CO_2$ | 0.34 |
| Comp. 2 | PC1/PC2 = 20/80 | PET1 | 12 | talc | 0.05 | $CO_2$ | 0.34 |
| Comp. 3 | PC1/PC2 = 20/80 | PET2 | 12 | talc | 0.05 | $CO_2$ | 0.34 |
| Comp. 4 | PC1/PC2 = 20/80 | PET3 | 12 | talc | 0.05 | $CO_2$ | 0.34 |

| | Forming Condition of Foamed Parison | | | |
|---|---|---|---|---|
| | Discharge rate kg/hr | Lip clearance mm | Discharge rate per opening area kg/h·cm² | Foamed parison surface temperature °C. |
| Ex. 1 | 250 | 2.7 | 33 | 234 |
| Ex. 2 | 250 | 2.7 | 33 | 230 |

TABLE 3-continued

| | | | | |
|---|---|---|---|---|
| Ex. 3 | 250 | 2.7 | 33 | 230 |
| Ex. 4 | 250 | 2.7 | 33 | 234 |
| Ex. 5 | 200 | 1.6 | 44 | 230 |
| Ex. 6 | 190 | 1.6 | 42 | 230 |
| Ex. 7 | 250 | 2.7 | 33 | 234 |
| Ex. 8 | 250 | 2.7 | 33 | 232 |
| Ex. 9 | 190 | 1.6 | 42 | 230 |
| Ex. 10 | 170 | 2.7 | 22 | 236 |
| Ex. 11 | 250 | 2.7 | 33 | 236 |
| Ex. 12 | 170 | 2.7 | 22 | 236 |
| Ex. 13 | 200 | 1.6 | 44 | 230 |
| Comp. 1 | 300 | 2.7 | 40 | 240 |
| Comp. 2 | 250 | 2.7 | 33 | 238 |
| Comp. 3 | 250 | 2.7 | 33 | 238 |
| Comp. 4 | 250 | 2.7 | 33 | 238 |

In Table 4, "PC1/PC2=20/80" means that the polycarbonate resin used is a dry blend of 20 parts by weight of PC1 and 80 parts by weight of PC2.

The amount of each of the polyester resin and the cell controlling agent is per 100 parts by weight of the polycarbonate resin.

TABLE 4

Results of Evaluation of Foamed Molded Articles

| | Glass transition temperature ° C. | Melt viscosity Pa·s | Density g/cm³ | Average thickness mm | Closed cell content % | Average cell diameter μm | Charpy impact strength kJ/m² | Heat sag value mm | Appearance |
|---|---|---|---|---|---|---|---|---|---|
| Ex. 1 | 138 | 2,500 | 0.28 | 3.0 | 50 | 500 | 11 | 0.9 | good |
| Ex. 2 | 130 | 2,300 | 0.25 | 3.0 | 55 | 400 | 9 | 1.1 | good |
| Ex. 3 | 125 | 2,100 | 0.24 | 3.0 | 55 | 400 | 9 | 1.6 | good |
| Ex. 4 | 138 | 2,600 | 0.22 | 4.0 | 70 | 500 | 9 | 0.8 | good |
| Ex. 5 | 130 | 2,400 | 0.15 | 5.0 | 90 | 300 | 6 | 1.3 | good |
| Ex. 6 | 125 | 2,200 | 0.16 | 6.0 | 90 | 350 | 5 | 1.8 | good |
| Ex. 7 | 136 | 2,100 | 0.24 | 3.0 | 60 | 500 | 9 | 1.2 | good |
| Ex. 8 | 140 | 2,400 | 0.26 | 3.0 | 60 | 500 | 5 | 1.0 | good |
| Ex. 9 | 138 | 2,400 | 0.15 | 5.5 | 90 | 300 | 7 | 1.1 | good |
| Ex. 10 | 138 | 2,400 | 0.30 | 3.0 | 70 | 500 | 13 | 0.7 | good |
| Ex. 11 | 138 | 2,800 | 0.28 | 3.5 | 65 | 400 | 9 | 0.8 | good |
| Ex. 12 | 138 | 2,600 | 0.43 | 2.5 | 70 | 600 | 22 | 0.5 | good |
| Ex. 13 | 130 | 2,200 | 0.17 | 4.5 | 75 | 350 | 6 | 1.5 | good |
| Comp. 1 | 147 | 3,200 | 0.43 | 2.5 | 10 | 800 | 18 | 0.5 | poor |
| Comp. 2 | 77/142 | 2,900 | 0.50 | 2.0 | 20 | 500 | 17 | 1.0 | poor |
| Comp. 3 | 78/143 | 3,000 | 0.60 | 3.0 | 10 | 500 | 17 | 1.0 | poor |
| Comp. 4 | 135 | 2,500 | 0.38 | 2.5 | 25 | 800 | 13 | 1.5 | poor |

INDUSTRIAL APPLICABILITY

The polycarbonate resin foamed molded article obtained by the method of the present invention has excellent thermal insulating property, heat resistance and mechanical strength and, therefore, may be used for various applications such as automobile parts, electric or electronic parts, receptacles and packaging materials.

The invention claimed is:

1. A method for producing a polycarbonate resin hollow foamed molded article comprising kneading a polycarbonate resin (A), a polyester resin (B) in an amount of 5 to 80 parts by weight per 100 parts by weight of the polycarbonate resin (A) and a foaming agent to obtain a foamable molten resin, extruding the foamable molten resin to obtain a foamed parison, and blow molding the foamed parison, which is maintained in a softened state after extruding the foamable molten resin, in a mold disposed directly beneath a die to form the hollow foamed molded article, wherein the polyester resin (B) is a polyester copolymer containing diol component units, 10 to 80 mol % of which are glycol component units each having a cyclic ether structure which is represented by a formula (1) or a formula (2), and dicarboxylic acid component units, and wherein the polycarbonate resin (A) is composed of a polycarbonate resin (A1) having a melt viscosity of 2,000 to 3,000 Pa·s at 250° C. and at a shear rate of 100 sec$^{-1}$ and a polycarbonate resin (A2) having a melt viscosity of 3,500 to 6,000 Pa·s at 250° C. and at a shear rate of 100 sec$^{-1}$, a weight ratio of the resin (A1) to the resin (A2) being 90:10 to 50:50, the formula (1):

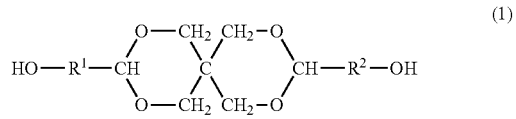

wherein, $R^1$ and $R^2$ each independently represent a characteristic group selected from noncyclic hydrocarbon groups each having 1 to 10 carbon atoms, alicyclic hydrocarbon groups each having 3 to 10 carbon atoms and aromatic hydrocarbon groups each having 6 to 10 carbon atoms, and the formula (2):

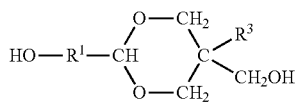 (2)

wherein, $R^1$ represents a characteristic group selected from noncyclic hydrocarbon groups each having 1 to 10 carbon atoms, alicyclic hydrocarbon groups each having 3 to 10 carbon atoms and aromatic hydrocarbon groups each having 6 to 10 carbon atoms, and $R^3$ represents a characteristic group selected from noncyclic hydrocarbon groups each having 1 to 10 carbon atoms, alicyclic hydrocarbon groups each having 3 to 10 carbon atoms and aromatic hydrocarbon groups each having 6 to 10 carbon atoms, and wherein the polycarbonate resin hollow foamed molded article has an apparent density of 0.1 to 0.4 g/cm³, an average cell diameter in the thickness direction of 100 to 500 μm, and a closed cell content of 50% or more.

2. The method for producing a polycarbonate resin hollow foamed molded article according to claim 1, wherein the polycarbonate resin (A) has a melt viscosity of 2,000 to 6,000 Pa·s at 250° C. and at a shear rate of 100 sec⁻¹.

3. The method for producing a polycarbonate resin hollow foamed molded article according to claim 1, wherein the polycarbonate resin (A1) has a melt tension at 250° C. of 15 cN or more.

4. The method for producing a polycarbonate resin hollow foamed molded article according to claim 1, wherein the polyester resin (B) has a melt viscosity of 300 to 1,500 Pa·s at 250° C. and at a shear rate of 100 sec⁻¹.

5. The method for producing a polycarbonate resin hollow foamed molded article according to claim 1, wherein the diol component units that constitute the polyester resin (B) comprise 15 to 50 mol % of 3,9-bis(1,1-dimethyl-2-hydroxyethyl)-2,4,8,10-tetraoxaspiro[5.5]undecane component units, and 85 to 50 mol % of ethylene glycol component units, with the proviso that a total amount of the both component units is 100 mol %, and wherein the dicarboxylic acid component units comprise terephthalic acid component units.

6. The method for producing a polycarbonate resin hollow foamed molded article according to claim 1, wherein the polyester resin (B) shows an exothermic calorific value of 5 J/g or less inclusive of 0 J/g in a DSC curve thereof obtained by heat flux differential scanning calorimetry in which the polyester resin (B) is maintained at a temperature of 300° C. for 10 minutes and thereafter gradually cooled at a cooling speed of 10° C./min.

7. The method for producing a polycarbonate resin hollow foamed molded article according to claim 1, wherein the foaming agent is an inorganic physical foaming agent.

8. The method for producing a polycarbonate resin hollow foamed molded article according to claim 1, wherein the amount of the polyester resin (B) is 5 to 45 parts by weight per 100 parts by weight of the polycarbonate resin (A).

* * * * *